Feb. 9, 1943. H. ZERWECK 2,310,270
TANK
Filed Feb. 24, 1941 2 Sheets-Sheet 1

INVENTOR.
Herman Zerweck
BY Gerald J. Baldwin
his Attorney

Feb. 9, 1943.  H. ZERWECK  2,310,270
TANK
Filed Feb. 24, 1941  2 Sheets-Sheet 2

INVENTOR.
Herman Zerweck
Gerald F. Baldwin
BY  his Attorney

Patented Feb. 9, 1943

2,310,270

UNITED STATES PATENT OFFICE 2,310,270

TANK

Herman Zerweck, Grosse Pointe, Mich.

Application February 24, 1941, Serial No. 380,261

8 Claims. (Cl. 195—134)

This invention relates to improvements in tanks, and refers particularly to fermentation tanks for use in the manufacture of ale, beer, distillers' mash and other fermented products.

It is an object of the invention to provide a fermentation tank divided by a substantially vertical wall or partition the top of which is spaced from the top of the tank thereby dividing it into a larger main portion for the fermenting product and a smaller receiving portion to receive scum or yeast that flows over the top of the partition while the product is fermenting.

Another object of the invention is to provide such a fermentation tank in the form of a horizontally disposed truncated cone with the partition located toward the larger end of the tank so that scum or yeast rising from the fermenting product in the main portion may readily flow toward the partition over which it is decanted into the receiving portion without fear of air pockets forming which would hinder or prevent the natural flow of scum or yeast to and over the partition.

A further object of the invention is to provide such a fermentation tank in the form of a horizontally disposed truncated cone having suitable outlets from both the main portion and the receiving portion located adjacent the lower parts of these portions to facilitate drainage and the washing out of each of the said tank portions.

Other objects of the invention are to provide such a fermentation tank wherein opposed manholes are provided through the larger end of the tank and through the partition to facilitate ingress and egress to both sections; and wherein an observation glass is provided in the larger end of the tank for observing decantation over the partition into the receiving portion.

Yet another object of the invention is to provide such a fermentation tank so made in two separate portions that both portions and both sides of the partition may be readily lined with a glass coating or as otherwise desired and subsequently joined together.

Having thus briefly and broadly stated some of the objects and advantages of the invention I will now proceed to describe it in detail with the aid of the accompanying drawings, in which.

Figure 1:
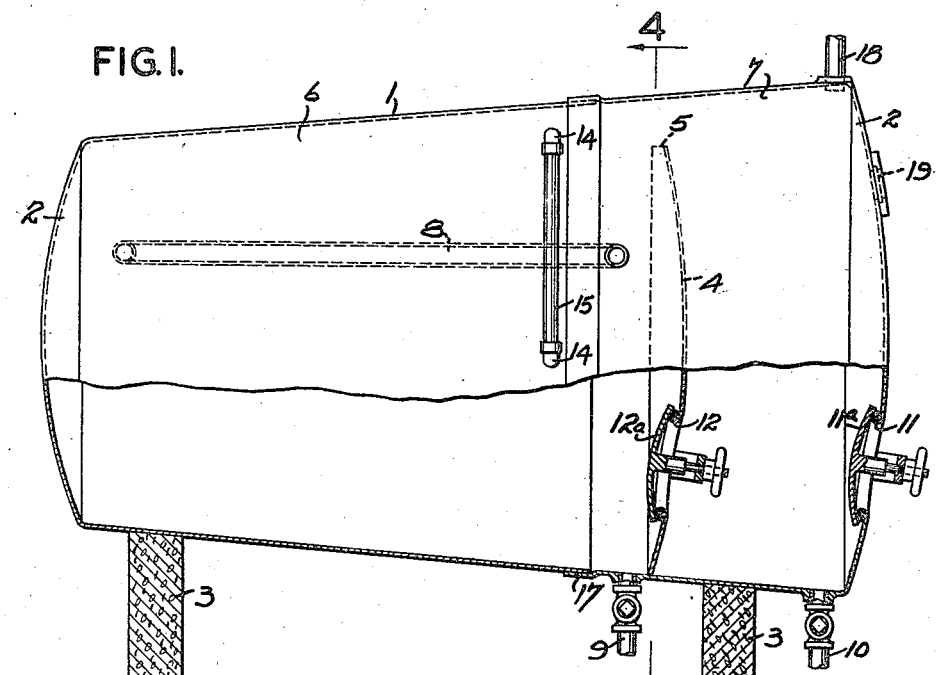
Figure 1 illustrates a side elevation of the invention, partly in section.
Figure 2:
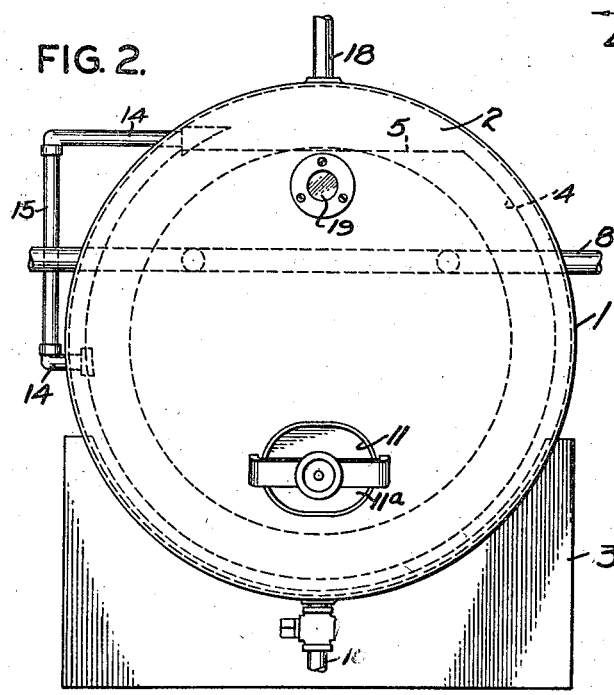
Figure 2 is a front view thereof.
Figure 3:
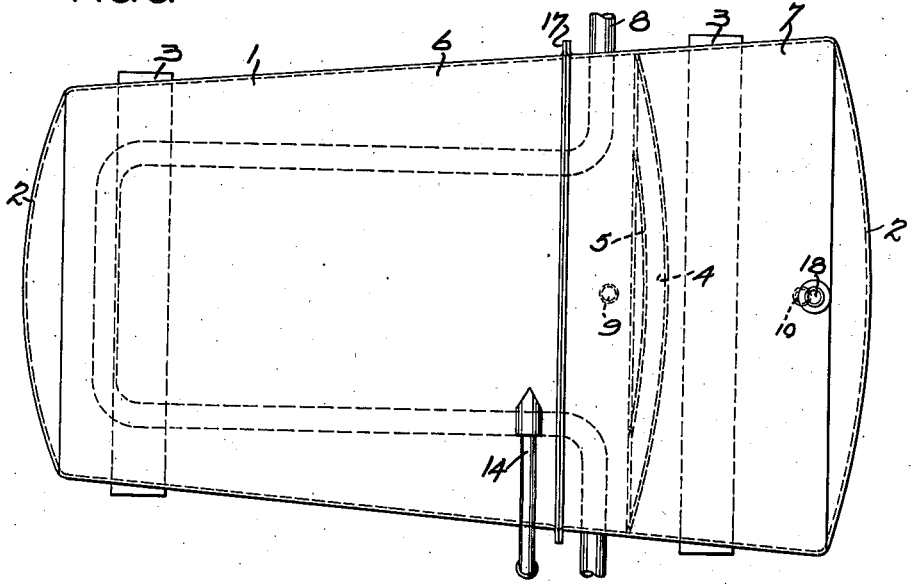
Figure 3 is a plan view.
Figure 4:
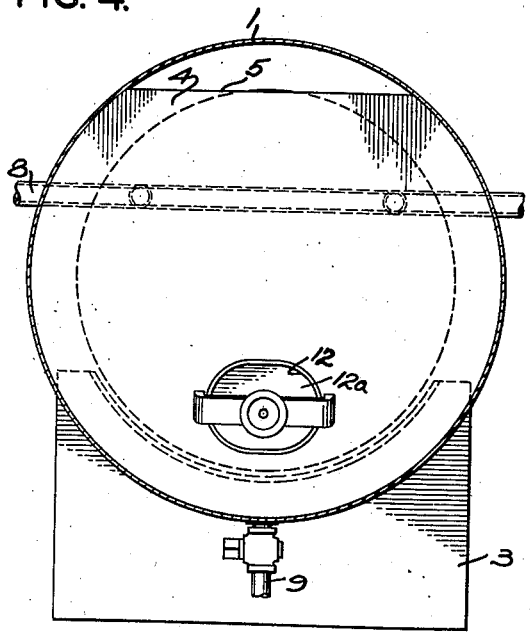
Figure 4 is a section on the line 4—4 of Figure 1.

Referring to the drawings, 1 designates a fermentation tank in the form of a truncated cone, and having conventional dished ends of heads 2. The tank is suitably mounted upon blocks or other supports 3 so that its axis lies substantially horizontal. Provided in the tank towards its larger head 2 is a partition 4, preferably dished so as to lie parallel with the adjacent dished tank head. The sides and bottom of the partition 4 are welded or otherwise suitably secured to the shell of the tank, and the top 5 of the said partition is horizontal and spaced from the top of the tank shell to provide communication from the larger main portion 6 of the tank into the smaller receiving portion 7.

8 denotes a horizontal cooler coil introduced through opposite sides of the main portion 6 adjacent the partition 4 and extending towards the smaller end of the tank, across the latter and back towards the partition, thereby providing for the flow of a cooling medium without obstructing the receiving portion 7 of the tank into which men must enter from time to time for cleaning and inspection purposes.

9 and 10 indicate two valved outlets, one adjacent the lowest point in the main portion 6 and the other adjacent the lowest point in the receiving portion 7, to permit separate draining of their respective portions. The filling of the main portion 6 of the tank may be accomplished through the valved outlet 9 or other provision, not shown, may be provided in the tank shell for this purpose. Provided in the larger tank head 2 and the partition 4 are aligned manholes 11 and 12 normally closed by covers 11a and 12a respectively. Mounted in the shell portion 6 preferably adjacent the partition 4, are two vertically aligned fittings 14 one towards the top of the tank and the other beneath it. Extending between them is a gauge glass 15 to indicate the height of the liquid in the tank.

Through the top of the tank 1 adjacent its larger end or head 2 an opening 18 into the receiving portion 7 is provided through which air or gases may be expelled from the tank at substantially its highest point, or through which water may be injected into the tank for such purposes as removing or flushing scum or yeast from the receiving portion 7 through the outlet 10. 19 denotes an observation glass mounted on the larger head 2 over a suitable aperture formed through it, so that the condition of the scum or yeast being decanted can be seen.

In order to facilitate the manufacture of the tank, which is usually glass lined, I make the two ends separately and coat them internally and both sides of the partition, and then weld or otherwise suitably connect the two parts together as indicated at 17. The interior of the tank adjacent and around the joint is then suitably treated with glass enamel or other preferred material.

From the foregoing it will be clearly seen that the tank in the form of a truncated cone has the following advantages: scum or yeast will flow toward the larger end of the tank and air pockets will not form or be caused during this movement; when used either for beer storage or for secondary fermentation complete expulsion of air is thus facilitated; and at the same time complete drainage of the tank, from either or both portions is assured.

The partition 4 divides the tank into two portions so that scum or yeast will flow over the partition and be decanted into the receiving portion thereby facilitating separation or fractionation of the scum or yeast during fermentation. The dished shape of the partition, which is concavo-convex and of similar curvature to that of the adjacent head 2, enables it to withstand pressures exerted thereon both while heating and cooling during manufacture and by the weight of the liquid in the main portion of the tank.

While the preferred embodiment of the invention has been described and shown, it is understood that alterations and modifications may be made thereto provided the alterations and modifications fall within the scope of the appended claims.

What I claim is:

1. A vessel of the character described comprising a tank in the form of a horizontally disposed truncated cone having heads closing its extremities, a partition within the tank extending transversely adjacent its larger extremity, said partition being secured to the bottom and sides of the inner tank periphery whereby the tank is divided into two portions in communication with one another only between the top of the partition and the top part of the tank periphery, the tank portion extending from the smaller head being adapted to contain a fermenting liquid so that scum or yeast may flow towards the partition and be decanted thereover into the tank portion extending from the larger head, the tank periphery having an opening formed through the top thereof adjacent the larger head for the expulsion of air or gas, and separate outlet means provided in the two tank portions adjacent their lowest points.

2. A fermentation vessel comprising a closed tank having a substantially vertical partition therein secured to the tank bottom and sides dividing the tank interior into two compartments in communication with one another only between the top of said partition and the top of the tank, one compartment being adapted to contain a fermenting product and scum or yeast rising therefrom being adapted to be decanted over said partition into the other compartment.

3. A fermentation vessel comprising a tank of cylindrical cross section having its axis substantially horizontally disposed, a partition within the tank secured to the bottom and sides of the latter dividing the interior of said tank into two compartments of unequal length in communication with one another only between the top of the partition and the top of the tank whereby scum or yeast rising from a fermenting product in the larger compartment is adapted to be decanted over said partition into the smaller compartment, and separate valved outlets from each compartment.

4. A fermentation vessel comprising a closed tank having a substantially vertical partition therein nearer to one extremity of the tank than the other dividing said tank into a larger and a smaller compartment, said partition being secured to the bottom and sides of said tank and having its upper margin spaced from the top of the latter whereby said compartments are in communication with one another only between the top of the partition and the top of the tank, the larger compartment being adapted to contain a fermenting product whereby scum or yeast rising therefrom is adapted to flow over said partition into the smaller compartment, said partition and said tank extremity nearer thereto having aligned manhole openings formed therethrough, and a cover normally closing each opening.

5. A fermentation vessel comprising a closed tank having a partition therein dividing said tank into two compartments, said partition being secured to the sides and top of the tank whereby communication between the compartments is permitted only over the top of said partition, one compartment being adapted to contain a fermenting product scum or yeast from which is adapted to rise and flow over said partition into the other compartment, the bottom of the tank being somewhat downwardly inclined throughout its length towards the outer end of the compartment into which the scum or yeast flows, and a valved outlet from each compartment adjacent the lowest point therein.

6. A fermentation vessel comprising a closed tank having a substantially vertical partition therein dividing the tank into two compartments, said partition being secured to the bottom and sides of said tank whereby communication between the two compartments is only obtained over the top of the partition, one compartment being adapted to contain a fermenting product from which rising scum or yeast is adapted to be decanted over the partition into the other compartment, the top of the tank being somewhat upwardly inclined throughout its length towards the outer end of the compartment into which the scum is decanted to facilitate a free flow over said partition.

7. A fermentation vessel comprising a tank in the form of a truncated cone having its axis substantially horizontal and closed at its extremities, a substantially vertical partition secured to the bottom and sides of the tank dividing its interior into two compartments, said partition permitting communication between said compartments only between the top of the partition and the top of the tank, the compartment extending from the tank end of smaller diameter being adapted to contain a fermenting product and scum or yeast therefrom being adapted to flow over said partition into the compartment extending to the larger extremity of the tank.

8. A fermentation vessel comprising a closed tank having a substantially vertical partition therein secured to the bottom and sides thereof dividing said tank into two compartments communication between which is only obtained between the top of the partition and the top of the tank, one compartment being adapted to contain a fermenting product so that yeast and scum rising therefrom flows over said partition into the other compartment, the outer extremity of the tank forming one end of said other compartment being apertured substantially in alignment with the top of said partition, and an observation glass mounted over said aperture to close same and permit inspection of the scum or yeast flowing over said partition.

HERMAN ZERWECK.